(12) United States Patent
DeGott et al.

(10) Patent No.: US 9,714,534 B1
(45) Date of Patent: Jul. 25, 2017

(54) DOOR CLOSER

(71) Applicant: International Door Closers, Inc., Nashville, TN (US)

(72) Inventors: Danny Dean DeGott, Nashville, TN (US); Siho Sung, Seoul (KR)

(73) Assignee: International Door Closers, Inc., Nashville, TN (US)

( * ) Notice: Subject to any disclaimer, the term of this patent is extended or adjusted under 35 U.S.C. 154(b) by 0 days.

(21) Appl. No.: 15/296,436

(22) Filed: Oct. 18, 2016

Related U.S. Application Data

(60) Provisional application No. 62/369,737, filed on Aug. 1, 2016.

(51) Int. Cl.
*E05F 3/10* (2006.01)
*E05F 3/04* (2006.01)
*E05F 3/12* (2006.01)

(52) U.S. Cl.
CPC .................. *E05F 3/04* (2013.01); *E05F 3/12* (2013.01); *E05Y 2900/132* (2013.01); *Y10T 16/2769* (2015.01)

(58) Field of Classification Search
CPC ...... E05F 3/104; E05F 3/12; E05Y 2900/132; Y10T 16/2769; Y10T 16/276; Y10T 16/2788; Y10T 16/56; Y10T 16/61; Y10T 16/2777; Y10S 16/09; Y10S 16/21
USPC ................ 16/53, 51, 58, 71, 82, 56, DIG. 9, 16/DIG. 21; 49/137
See application file for complete search history.

(56) References Cited

U.S. PATENT DOCUMENTS

| | | | | | |
|---|---|---|---|---|---|
| 3,137,888 | A | * | 6/1964 | Blom | E05F 3/104 16/51 |
| 3,149,366 | A | * | 9/1964 | Martin | E05F 3/104 16/51 |
| 3,174,177 | A | * | 3/1965 | Bugge | E05F 3/104 16/53 |
| 3,246,362 | A | * | 4/1966 | Jackson | E05F 3/104 16/51 |

(Continued)

FOREIGN PATENT DOCUMENTS

GB          936320 A  *  9/1963  ............. E05F 3/104

OTHER PUBLICATIONS

U.S. Design Patent Application 29581313, entitled "Door Closer" by Danny Dean DeGott, filed Oct. 18, 2016.

(Continued)

*Primary Examiner* — William Miller
(74) *Attorney, Agent, or Firm* — Shane V. Cortesi

(57) ABSTRACT

A hydraulic door closer is disclosed. The hydraulic door closer may include a top cap surrounded by an O-ring that is located at the top of the hydraulic door closer housing opposite a spindle to seal the hydraulic fluid within the housing. In addition to or in lieu of the top cap design, the door closer may include a locking washer to secure the valves to the housing; epoxy and an O-ring at the interface between the top cap and the housing of the door closer; use of a dual-walled rubber seal around the spindle; use of dual O-rings on each valve stems; use of caps that are made of the same material as the housing instead of aluminum and use of epoxy on the end caps; and/or use of backcheck with an adjustable spring.

17 Claims, 11 Drawing Sheets

(56) References Cited

U.S. PATENT DOCUMENTS

| | | | |
|---|---|---|---|
| 4,064,589 A * | 12/1977 | Bejarano | E05F 3/104 16/53 |
| 5,417,013 A * | 5/1995 | Tillmann | E05F 3/104 16/53 |
| 6,397,430 B1 | 6/2002 | Brown | |
| 7,003,847 B2 | 2/2006 | Brown | |
| 7,421,761 B2 * | 9/2008 | Johnson | E05F 3/104 16/52 |
| 7,966,771 B2 * | 6/2011 | Bienek | E05F 3/104 49/137 |
| 8,863,357 B1 | 10/2014 | Chang | |
| 2006/0196008 A1 | 9/2006 | Karkkainen | |
| 2008/0034535 A1 | 2/2008 | Chiang | |
| 2008/0092447 A1 * | 4/2008 | Bienek | E05F 3/104 49/340 |
| 2008/0127562 A1 * | 6/2008 | Bienek | E05F 3/104 49/334 |
| 2008/0209811 A1 * | 9/2008 | Bienek | E05F 3/104 49/139 |
| 2008/0222957 A1 * | 9/2008 | Bienek | E05F 3/104 49/43 |
| 2011/0231023 A1 | 9/2011 | Copeland | |

OTHER PUBLICATIONS

CRL Jackson Grade-1 Heavy-Duty Spring 1-13/64" Extended Spindle Concealed (Model 20116M11B), available at http://crlaurence.com/crlapps/showline/offerpage.aspx?ProductID=192665&GroupID=67272&History=39325:3197:61559:61631:61702:61631&ModelID=67272&pom=0 (last accessed Sep. 19, 2016).

C.R. Laurence CRL Diamond Style Spindle Medium Duty 105° No Hold-Open Retrofit Overhead Concealed Door Closer—Body Only, available at http://www.sears.com/c-r-laurence-crl-diamond-style-spindle-medium-duty/p-SPM516748801?plpSellerId=Showerdoordirect.com&prdNo=1&blockNo=1&blockType=G1# (last accessed Sep. 19, 2016).

Door Closer Maintenance, Repair and Adjustment Info, available at http://www.parod.net/door-closer-info/ (last accessed Sep. 19, 2016).

Global Door Controls DC37-629 TC7730 Medium Duty Brute Concealed Door Closer Kawneer Husky, available at https://www.amazon.com/Global-Door-Controls-DC37-629-Concealed/dp/B00FG9E90W/ref=cm_cr_arp_d_product_top?ie=UTF8 (last accessed Sep. 19, 2016).

CR Laurence Door Hardware brochure 087100, available at http://www.crlaurence.com/adv/Architects/sweets/087100%20crl%20buyline%203069.pdf (last accessed Sep. 20, 2016).

* cited by examiner

DOOR CLOSER

RELATED APPLICATIONS

This application claims priority under 35 U.S.C. Section 119 to U.S. Provisional Application No. 62/369,737, filed Aug. 1, 2016, entitled "DOOR CLOSER", the contents of which are incorporated herein by reference in their entirety.

BACKGROUND

Technical Field

The present invention relates to door closers, more particularly, to hydraulic door closers whose opening cycle and closing cycle is controlled by the movement of hydraulic fluid within the door closer.

Background of the Invention

Hydraulic overhead concealed door closers typically include a spindle that extends below the closer housing to connect to the door as well as as a cap on the bottom of the closer housing that faces the door. In such prior designs, the spindle extends through the cap. Unfortunately, such caps are often not effective in preventing hydraulic fluid within the door closer from leaking, which is aided by gravity.

Fluid may also leak around the exterior of the spindle due to the fact that spindles may not have an entirely smooth exterior surface.

In prior designs, one or more adjustment valves are usually present. The adjustment valves control the flow of hydraulic fluid through the door closer. Without sealing around the valves, the valves are prone to leakage of hydraulic fluid.

Moreover, in prior designs, the end caps are typically comprised of aluminum whereas the closer housing is typically comprised of a different material (namely, steel) and the use of different materials can lead to leakage.

Finally, backcheck is feature on some door closers that prevents the door from crashing into the wall when it is opened suddenly. However, existing backcheck designs on the market use a fixed spring instead of an adjustable spring so that the strength of the spring force in the existing designs cannot be adjusted by the user.

Therefore, there is a need for new door closers that are less prone to leakage. There is also a need for new door closers with backcheck that also include an adjustable spring.

BRIEF SUMMARY

The present disclosure provides a door closer that is less prone to leaking and/or includes backcheck with an adjustable spring as described herein.

In some embodiments, the door closer includes one or more features that may resist leakage of hydraulic fluid: 1) the top cap is opposite the spindle and is on top of the housing so that gravity does not cause fluid to leak through the cap; 2) epoxy and an O-ring at the interface between the top cap and the housing of the door closer; 3) use of a rubber seal around the spindle, which may be in the form of a circular piece of rubber with an inner wall and outer wall and the rubber seal may compress the inner wall against the spindle to create a seal, and the seal may be comprised of metallocene butadiene rubber; 4) use of dual O-rings on each valve stems, namely, adjustment valves that include—three ridges/lip, a bottom ridge, a middle ridge, and a top ridge and an O-ring is between the bottom ridge and the middle ridge and a different O-ring is between the middle and between the top ridge; and/or 5) use of caps that are made of steel (the same material as the housing) instead of aluminum and use of epoxy on the end caps. The present disclosure also provides use of backcheck with an adjustable spring. The aforementioned is intended to provide a brief summary of some of the features of the present disclosure and is not intended to limit the present disclosure.

In some embodiments, the present overhead concealed door closer system comprising: a) a door frame defining a door opening, the door frame comprising a door frame width and a door frame top located above the door opening; b) a door comprising a door top and a door width, the door configured to pivot from a closed position in which the door covers the door opening, the door width is substantially parallel to the door frame width and the door top faces the door frame top, to an open position in which the door does not cover the door opening and in which the door width is not substantially parallel to the door frame width; c) a hydraulic overhead concealed door closer located in the door frame top and comprising: i) a housing comprising an interior, a top side, a bottom side opposite the top side and facing the door top when the door is in the closed position, a housing height extending from the housing top side to the housing bottom side and generally perpendicular to the door frame width and the door width, a front side, a rear side, a housing thickness extending from the housing front side to the housing rear side and generally perpendicular to the housing height and generally perpendicular to the door width when the door is in the closed position, a proximal end, a distal end, a housing width extending from the housing proximal end to the housing distal end and generally perpendicular to the housing height and the housing thickness and generally parallel to the door width when the door is in the closed position; ii) a cylinder located in the housing interior, the cylinder having a cylinder length generally parallel to the housing width; iii) a moveable piston located in the cylinder and configured to move at least partially along the cylinder length, the moveable piston dividing the housing interior into a proximal chamber and a distal chamber; iv) hydraulic fluid located in the proximal chamber and the distal chamber; v) at least one channel located in the housing interior and configured to transport hydraulic fluid between the proximal and distal chambers, the at least one channel having a channel length generally parallel to the housing width and the cylinder length; vi) a cam assembly comprising a spindle, the spindle having a spindle height generally parallel to the housing height and a spindle perimeter generally perpendicular to the spindle height, the spindle extending below the housing bottom side, the spindle configured to rotate about a spindle rotational axis generally parallel to the spindle height (rotate means at least partially rotate); vii) an arm attached to the spindle and to the door top; and viii) a top cap having a top cap diameter generally perpendicular to the housing height and sealing the distal chamber from the door frame, the top cap located at the top side of the housing and opposite to the spindle (more particularly opposite the tip of the spindle that extends below the bottom side of the housing). Optionally, pivoting the door from the closed position to the open position is configured to cause the spindle to rotate (i.e., partially rotate) about the spindle rotational axis and cause the piston to move within the cylinder at least partially along the cylinder length. Optionally, the spindle does not extend through the top cap. Optionally, the system further comprises a spindle seal, the spindle seal surrounding and compressing against the perimeter of the spindle and located below the top cap. Optionally, the spindle seal comprises a diameter generally perpendicular to the housing height. Optionally, the system further comprises a bottom bearing located between the spindle seal and the cam assembly, the bottom bearing comprising a diameter generally perpendicular to the housing height. Optionally, the top cap further comprises a top cap circumference and further wherein the system further comprises an O-ring surrounding the top cap circumference. Optionally, the top cap is attached to the housing via epoxy and threading. Optionally, the top cap and the housing are comprised of the same material. Optionally, the system further comprises at least one valve controlling the flow of the hydraulic fluid within the at least one channel, the at least one valve comprising a valve stem having a valve stem height generally parallel to the housing height and further wherein the valve stem comprises a top ridge (comprising a top ridge diameter perpendicular to the housing height), a middle ridge located below the top ridge (and comprising a middle diameter generally perpendicular to the housing height), and a lower ridge located below the top ridge and the middle ridge (and comprising a lower ridge diameter generally perpendicular to the housing height), a top O-ring located between the top ridge (and comprising a top O-ring diameter generally perpendicular to the housing height) and the middle ridge and compressing against the valve stem and a lower O-ring located between the middle ridge and the lower ridge and compressing against the valve stem (and comprising a lower O-ring diameter generally perpendicular to the housing height). Optionally, the system further comprises at least one end cap located on the proximal end of the housing, the end cap comprising an end cap diameter generally perpendicular to the housing width, at least one spring located distally relative to the end cap and the piston, the spring comprising a proximal end attached to the piston and a distal end, the spring having a relaxed position and a compressed position, and further wherein moving the door from the closed position to the open position is configured to cause the door arm to cause the spindle to rotate about the spindle rotation axis and cause the spring to move from the relaxed position to the compressed position and the piston to move distally (and the in the general direction of toward the spindle) within the cylinder. Optionally, the end cap is configured to seal the hydraulic fluid within the proximal chamber and the housing and the end cap are comprised of the same material. Optionally, the end cap further comprises a circumference and further wherein the system further comprises an O-ring, the O-ring surrounding and compressing against the end cap circumference. Optionally, pivoting the door from the closed position to the open position is configured to cause the piston to move distally (and generally towards the spindle) and move hydraulic fluid located distal to the piston distally within the cylinder. Optionally, moving the piston distally within the cylinder is configured to cause hydraulic fluid to move from the distal chamber through the at least one channel and into the proximal chamber. Optionally, pivoting the door from the open position to the closed position is configured to cause the piston to move proximally (and generally away from the spindle) and move hydraulic fluid located proximal to the piston proximally within the cylinder. Optionally, moving the piston proximally within the cylinder is configured to cause hydraulic fluid to move from the proximal chamber through the at least one channel and into the distal chamber.

BRIEF DESCRIPTION OF THE DRAWINGS

in FIG. 10, the housing is transparent to better show the channels.

FIG. 11 shows the location of the piston during the process of moving the door from the closed position to the open position.

FIG. 12 shows the location of the piston when the door is in the open position.

FIG. 13 shows the location of the piston during the process of moving the door between the opened and closed positions.

FIG. 14 shows the location of the piston when the door is in the closed position.

DETAILED DESCRIPTION

Figure 1:
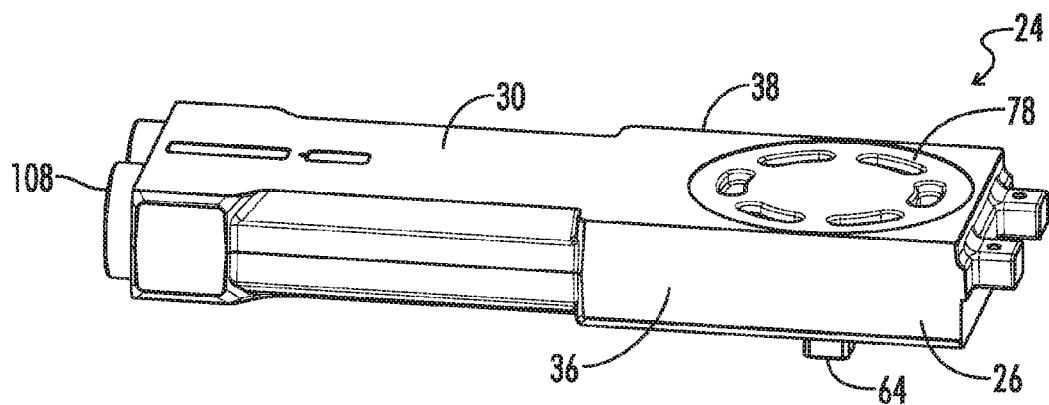
FIG. 1 illustrates a front perspective view of a hydraulic door closer of one embodiment of the present invention.

With reference to FIGS. 1-18, the present invention provides a hydraulic door closer system 10. In the drawings, not all reference numbers are included in each drawing for the sake of clarity. Preferably, the hydraulic door closer is an overhead concealed door closer. FIGS. 1-18 are engineering drawings, drawn to scale. However, it will be appreciated that other dimensional proportions between the components are possible.

Figure 2:
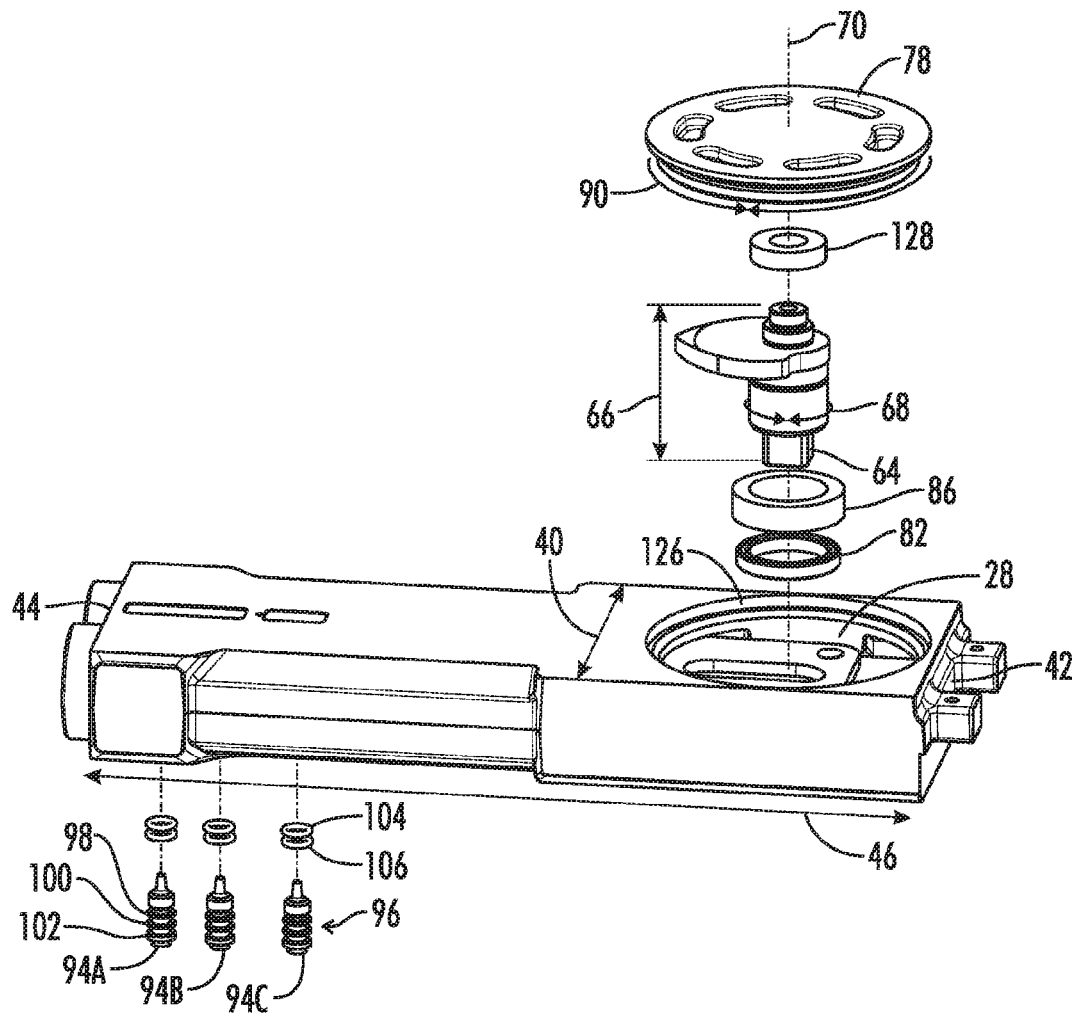
FIG. 2 illustrates a front exploded perspective view of the hydraulic door closer of FIG. 1.
Figure 3:
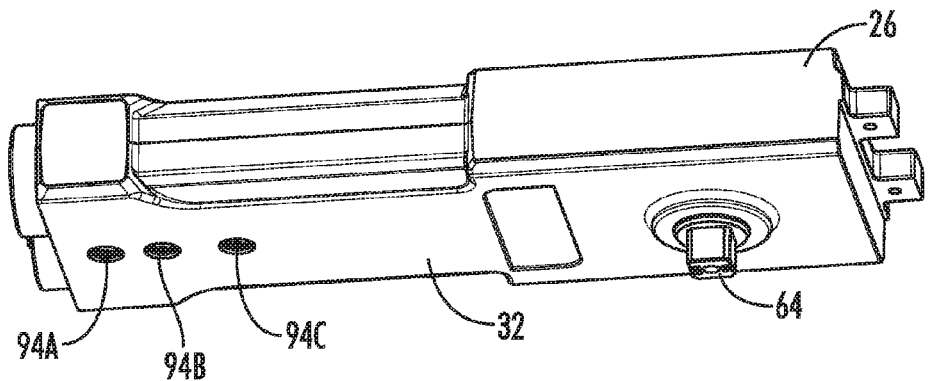
FIG. 3 illustrates a bottom perspective view of the hydraulic door closer of FIG. 1.
Figure 4:
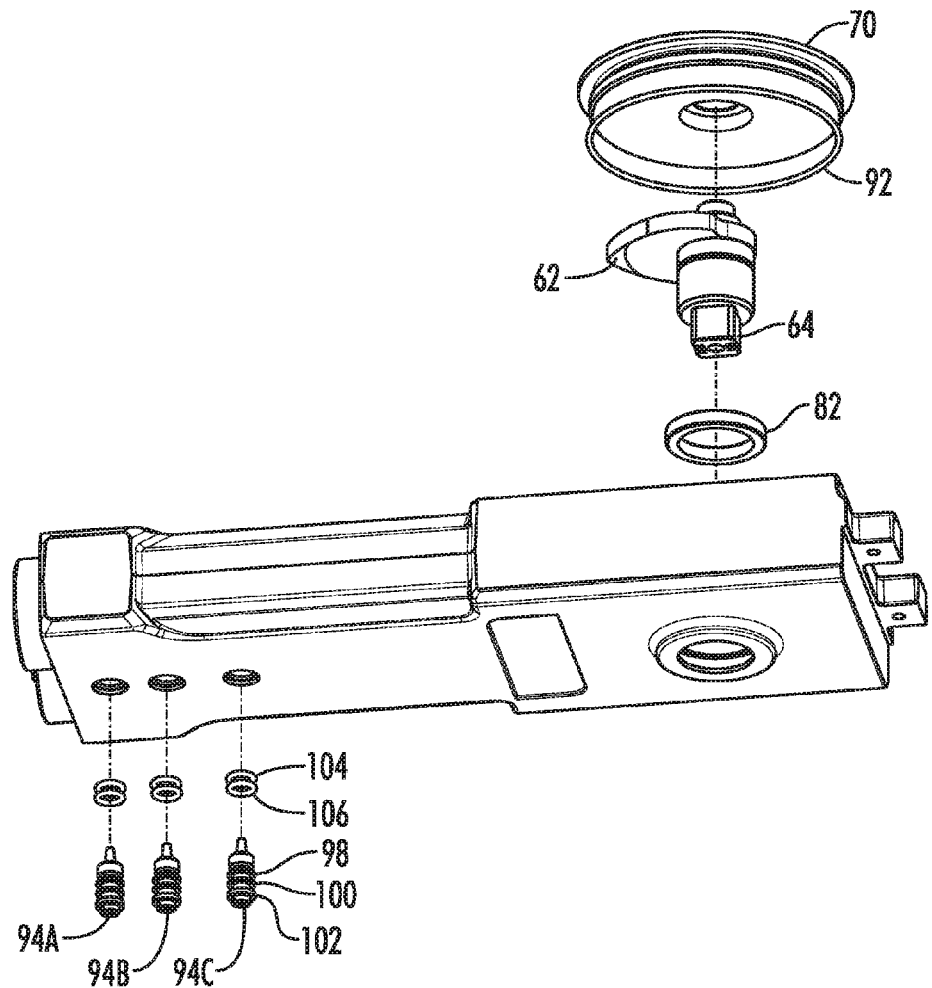
FIG. 4 illustrates a bottom exploded perspective view of the hydraulic door closer of FIG. 1.
Figure 5:
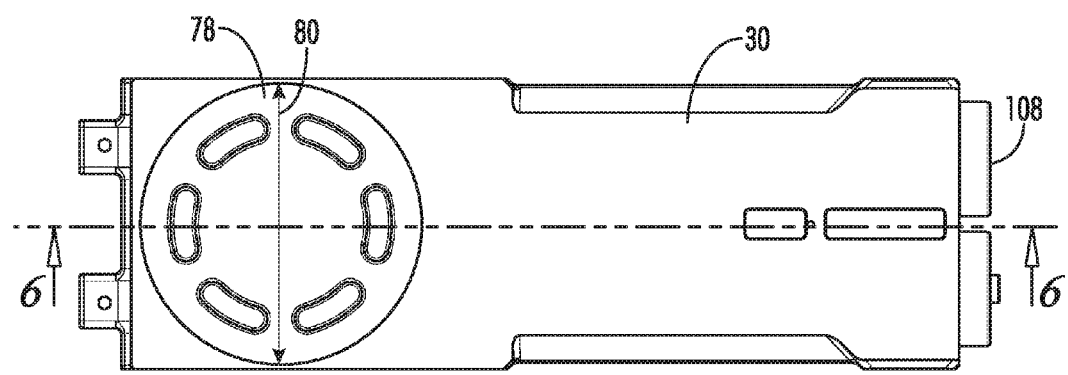
FIG. 5 illustrates a top plan view of the hydraulic door closer of FIG. 1.
Figure 6:
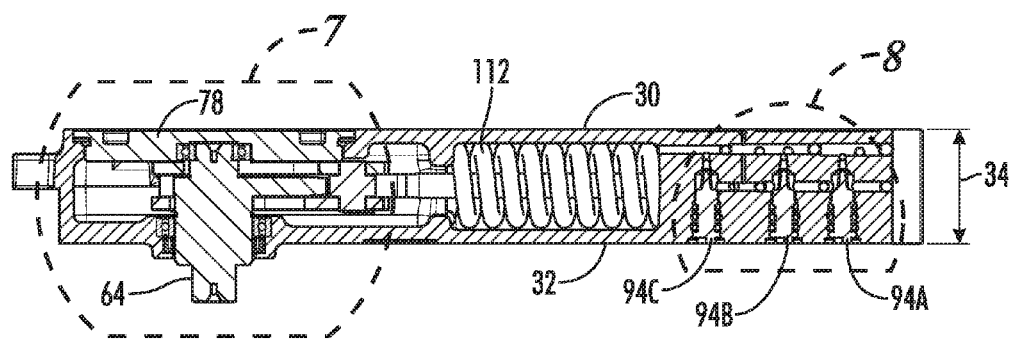
FIG. 6 illustrates a cross-sectional view of the hydraulic door closer of FIG. 5, taken along line 6-6 of FIG. 5.
Figure 7:
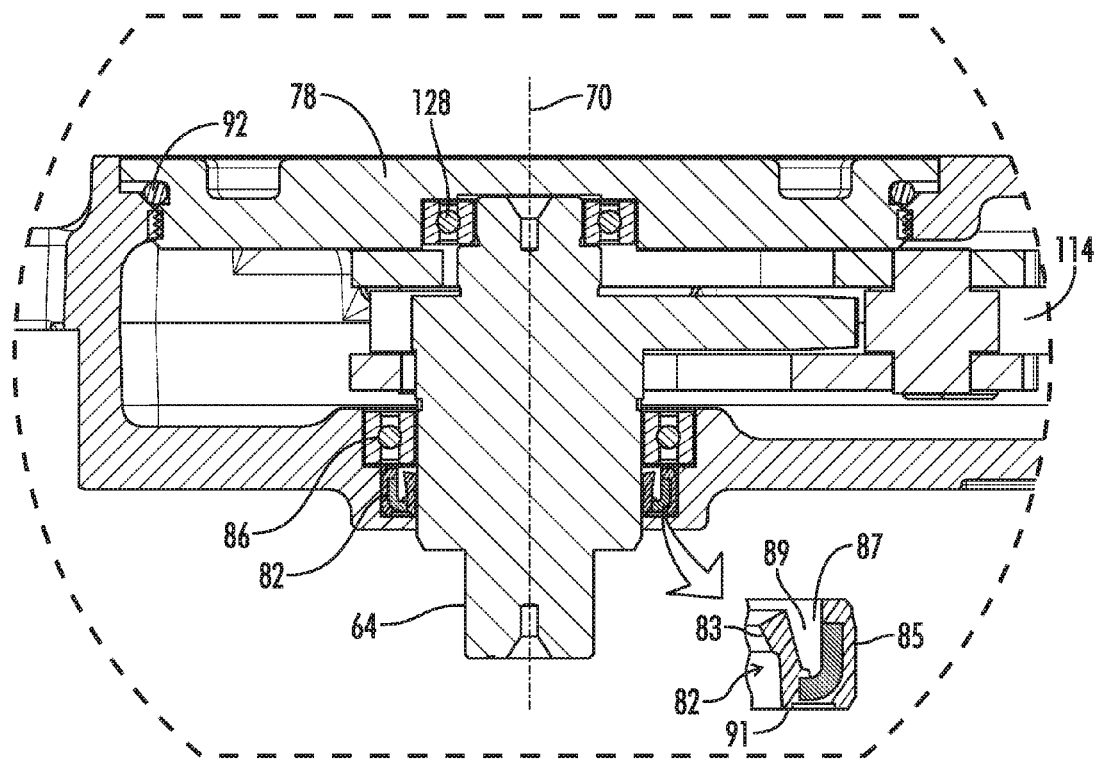
FIG. 7 illustrates a close-up cross-sectional view of the area of the hydraulic door closer denoted by the circled region labelled 7 in FIG. 6.
Figure 8:
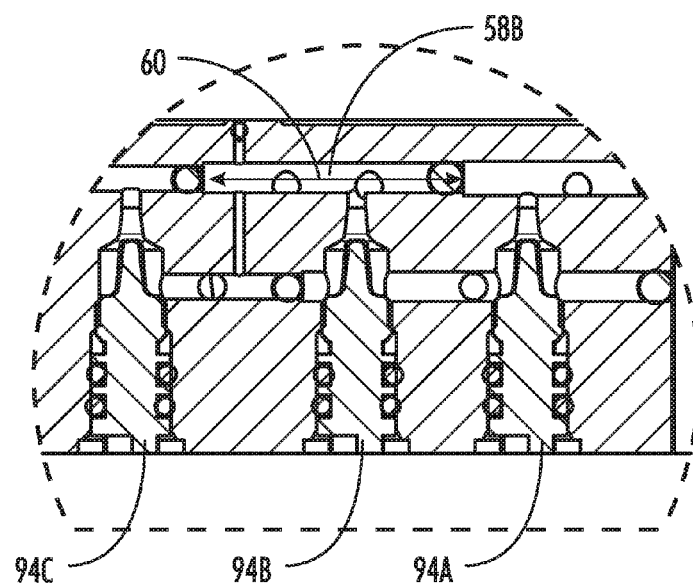
FIG. 8 illustrates a close-up cross-sectional view of the hydraulic door closer denoted by the circled region labelled 8 in FIG. 6.

Referring further to FIGS. 1-18, in some embodiments, the system is a hydraulic overhead concealed door closer system 10 comprising: a) a door frame 12 defining a door opening 14, the door frame 12 comprising a door frame width 16, a door frame height 18 generally perpendicular to the door frame width 16, and a door frame top 17 located above the door opening 14; b) a door comprising a door top 20 and a door width 22, the door configured to pivot from a closed position in which the door covers the door opening 14, the door width 22 is substantially parallel to the door frame width 16 and the door top 20 faces the door frame top 17, to an open position in which the door does not cover the door opening 14 and in which the door width 22 is not substantially parallel to the door frame width 16; and c) a hydraulic overhead concealed door closer 24 that may be located in the door frame top 17. The hydraulic overhead concealed door closer 24 may include i) a housing 26 comprising an interior 28, a top side 30, a bottom side 32 opposite the top side 30 and facing the door top 20 when the door is in the closed position, a housing height 34 extending from the housing top side 30 to the housing bottom side 32 and generally perpendicular to the door frame width 16 and the door width 22, a front side 36, a rear side 38, a housing thickness 40 extending from the housing front side 36 to the housing rear side 38 and generally perpendicular to the housing height 34 and generally perpendicular to the door width 22 when the door is in the closed position, a proximal end 44, a distal end 42, a housing width 46 extending from the housing proximal end 44 to the housing distal end 42 and generally perpendicular to the housing height 34 and the housing thickness 40 and generally parallel to the door width 22 when the door is in the closed position. The hydraulic overhead concealed door closer 10 may also include a cylinder 48 located in the housing interior 28, the cylinder 48 having a cylinder length 50 generally parallel to the housing width 46 as well as a moveable piston 52 located in the cylinder 48 and configured to move at least partially along the cylinder length 50, the moveable piston 52 dividing the housing interior 28 into a proximal chamber 56 and a distal chamber 54. The door closer may include multiple cylinders 48, each of which may have a piston 52. The door closer interior also includes fluid, e.g., hydraulic fluid, located in the proximal chamber 56 and the distal chamber 54. The door closer 10 may also include at least one channel 58A and 58B located in the housing interior 28 and configured to transport hydraulic fluid between the proximal and distal chambers 56 and 54, the at least one channel 58A and 58B having a channel length 60 generally parallel to the housing width 46 and the cylinder length 50. Multiple channels 58A and 58B and drains 119, 120, 121 and 122 such as those shown in the drawings are possible. The door closer 10 may also include a cam assembly 62 comprising a spindle 64, the spindle 64 having a spindle height 66 generally parallel to the housing height 34 and a spindle perimeter 68 generally perpendicular to the spindle height 66, the spindle 64 extending below the housing bottom side 32, the spindle 64 configured to rotate about a spindle rotational axis 70 generally parallel to the spindle height 66 (rotate means at least partially rotate). The system may also include an arm 72 attached to the spindle 64 and to the door top 20. The arm 72 may close around the spindle 64 and be adjustable using for example an Allen wrench. The door closer 10 may also include a top cap 78 having a top cap diameter 80 generally perpendicular to the housing height 34 and sealing the distal chamber 54 from the door frame 12, the top cap 78 located at the top side 30 of the housing 26 and opposite to the spindle 64. The top cap 78 may be located directly above the spindle 64. As shown in the drawings, the spindle 64 generally does not protrude through the top cap 78. Optionally, pivoting the door from the closed position to the open position is configured to cause the spindle 64 to rotate (i.e., partially rotate) about the spindle rotational axis 70 and cause the piston 52 to move within the cylinder 48 at least partially along the cylinder length 50. Optionally, the system further comprises a spindle seal 82, the spindle seal 82 surrounding and compressing against the perimeter 68 of the spindle 64 and located below the top cap 78. Optionally, the spindle seal 82 comprises a diameter 84 generally perpendicular to the housing height 34. Optionally, as best seen in FIG. 7, the spindle seal 82 has an inner wall 83, an outer wall 85, a v-shaped channel 87 between the inner wall 83 and outer wall 85, an open top end 89 (as best seen in FIGS. 2 and 7) and a closed bottom end 91 (as best seen in FIGS. 3 and 7). Prior to assembly into the housing 26, the inner wall 83 is angled (e.g., at approximately an angle of between about 10 to about 30 degrees relative to the outer wall 85). Once the spindle seal 82 is placed in the housing 26, it pushes against the spindle 64 for better sealing. The spindle seal 82 may be comprised of rubber, for example.

Optionally, the system further comprises a bottom bearing 86 located between the spindle seal 82 and the cam assembly 62, the bottom bearing 86 comprising a diameter 88 generally perpendicular to the housing height 34. The system may also include a top bearing 128 located above the spindle seal 82. Optionally, the top cap 78 further comprises a top cap circumference 90 and further wherein the system further comprises an O-ring 92 surrounding the top cap circumference 90. Optionally, the top cap 78 is attached to the housing 26 via epoxy and threading. Optionally, the top cap 78 and the housing 26 are comprised of the same material. Optionally, the system further comprises at least one valve 94A, 94B, and 94C controlling the flow of the hydraulic fluid within the at least one channel 58A and 58B, the at least one valve 94A, 94B, and 94C comprising a valve stem 96 having a valve stem height generally parallel to the housing height 34 and further wherein the valve stem 96 comprises a top ridge 98 (comprising a top ridge diameter perpendicular to the housing height 34), a middle ridge 100 located below the top ridge 98 (and comprising a middle diameter generally perpendicular to the housing height 34), and a lower ridge 102 located below the top ridge 98 and the middle ridge 100 (and comprising a lower ridge diameter generally perpendicular to the housing height 34), a top O-ring 104 located between the top ridge 98 (and comprising a top O-ring diameter generally perpendicular to the housing height 34) and the middle ridge 100 and compressing against the valve stem 96 and a lower O-ring 106 located between the middle ridge 100 and the lower ridge 102 and compressing against the valve stem 96 (and comprising a lower O-ring diameter generally perpendicular to the housing height 34). The valves 94A-C, which may be adjustable via a screw driver, may also be secured into housing 26 through the use of locking rings/washers 131 that are stamped into the housing 26 above the valves 94A-C, and prevent the valves 94A-C from screwing out of the housing 26. More particularly, the locking rings 131 may have a diameter that is slightly larger than the diameters of each of the housing ports leading to the valves 94A-C, and the locking rings 131 are press fit/stamped to force the locking rings 131 through the smaller ports.

Optionally, the system further comprises at least one end cap 108 located on the distal end 42 of the housing 26, the end cap 108 comprising an end cap diameter 110 generally perpendicular to the housing width 46, at least one spring 112 located proximally relative to the end cap 108 and the piston 52, the spring 112 comprising a distal end 116 attached to the piston 52 and a proximal end 114, the spring 112 having a relaxed position and a compressed position, and further wherein moving the door from the closed position to the open position is configured to cause the door arm 72 to cause the spindle 64 to rotate about the spindle rotation axis 70 and cause the spring 112 to move from the relaxed position to the compressed position and the piston 52 to move distally (and in the general direction of toward the spindle 64) within the cylinder 48. Optionally, the spring 112 is adjustable by a user, e.g., by turning a component on the end cap 108. Optionally, the end cap 108 is configured to seal the hydraulic fluid within the proximal chamber 56 and further wherein the housing 26 and the end cap 108 are comprised of the same material. Optionally, the end cap 108 further comprises a circumference and further wherein the system further comprises an end cap O-ring 118, the end cap O-ring 118 surrounding and compressing against the end cap circumference. Optionally, pivoting the door from the closed position to the open position is configured to cause the piston 52 to move distally (and generally towards the spindle 64) and move hydraulic fluid located distal to the piston 52 distally within the cylinder 48. Optionally, moving the piston 52 distally within the cylinder 48 is configured to cause hydraulic fluid to move from the distal chamber 54 through the at least one channel 58A and 58B and into the proximal chamber 56. Optionally, pivoting the door from the open position to the closed position is configured to cause the piston 52 to move proximally (and generally away from the spindle 64) and move hydraulic fluid located proximal to the piston 52 proximally within the cylinder 48. Optionally, moving the piston 52 proximally within the cylinder 48 is configured to cause hydraulic fluid to move from the proximal chamber 56 through the at least one channel 58A and 58B and into the distal chamber 54.

Optionally, the system is assembled as shown in FIG. 2, with the bottom bearing 86 placed in the port/opening 126 in the housing 26 that the top cap 78 closes, followed by the cam assembly 62, followed by the top cap 78. The top cap 78 is positioned by moving the top cap 78 toward the port/opening 126 in the housing 26. As shown, the spindle 64 does not protrude through the top cap 78.

The system may be sold without the door, door frame 12, and arm 72. The present disclosure may also be used in a method that includes providing the door closer 10 and installing the door closer 10 in a door frame 12 and attaching the door closer 10 to a door.

Figure 9:
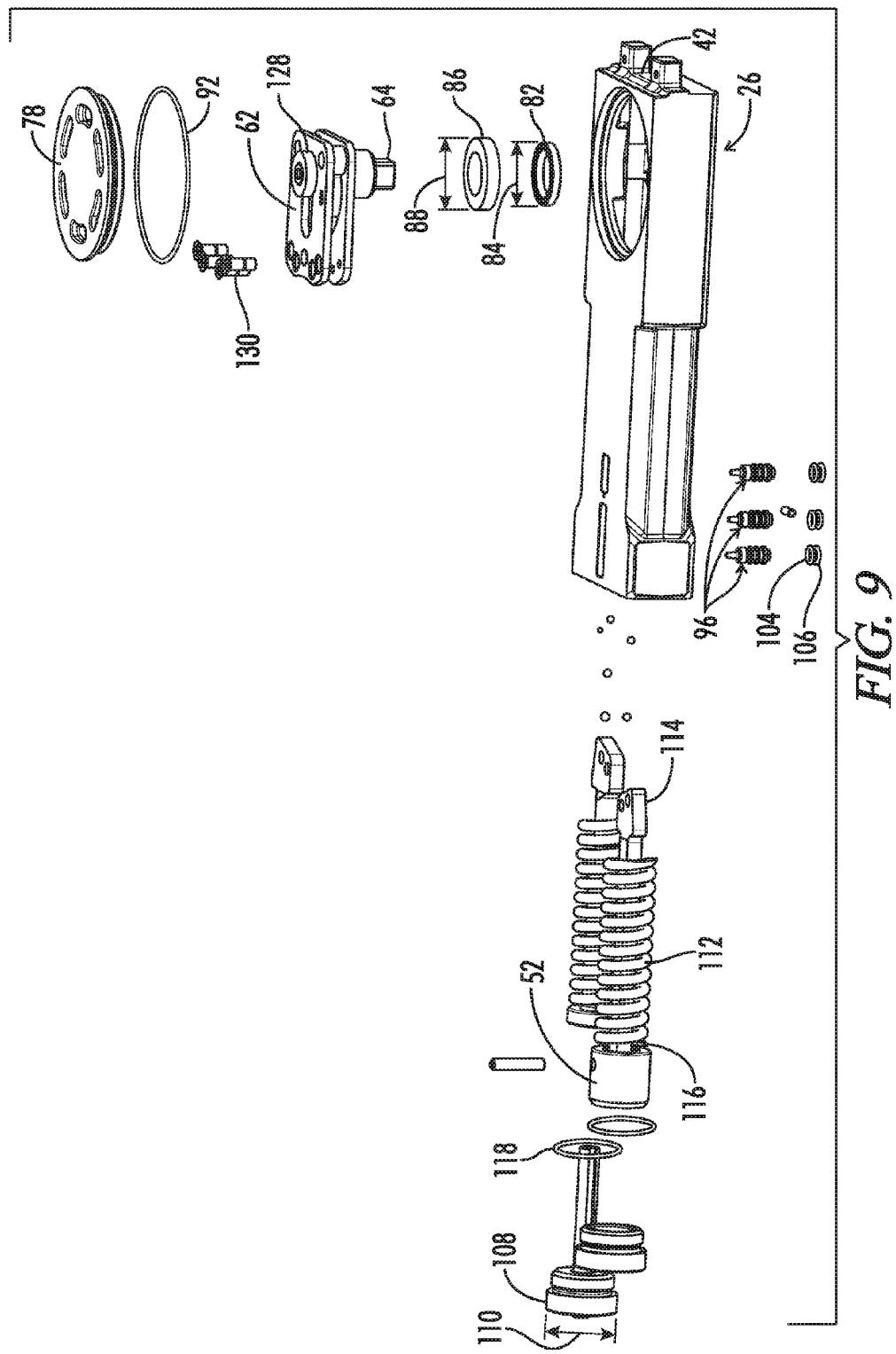
FIG. 9 illustrates a front, exploded view of the hydraulic door closer of FIG. 1.
Figure 10:
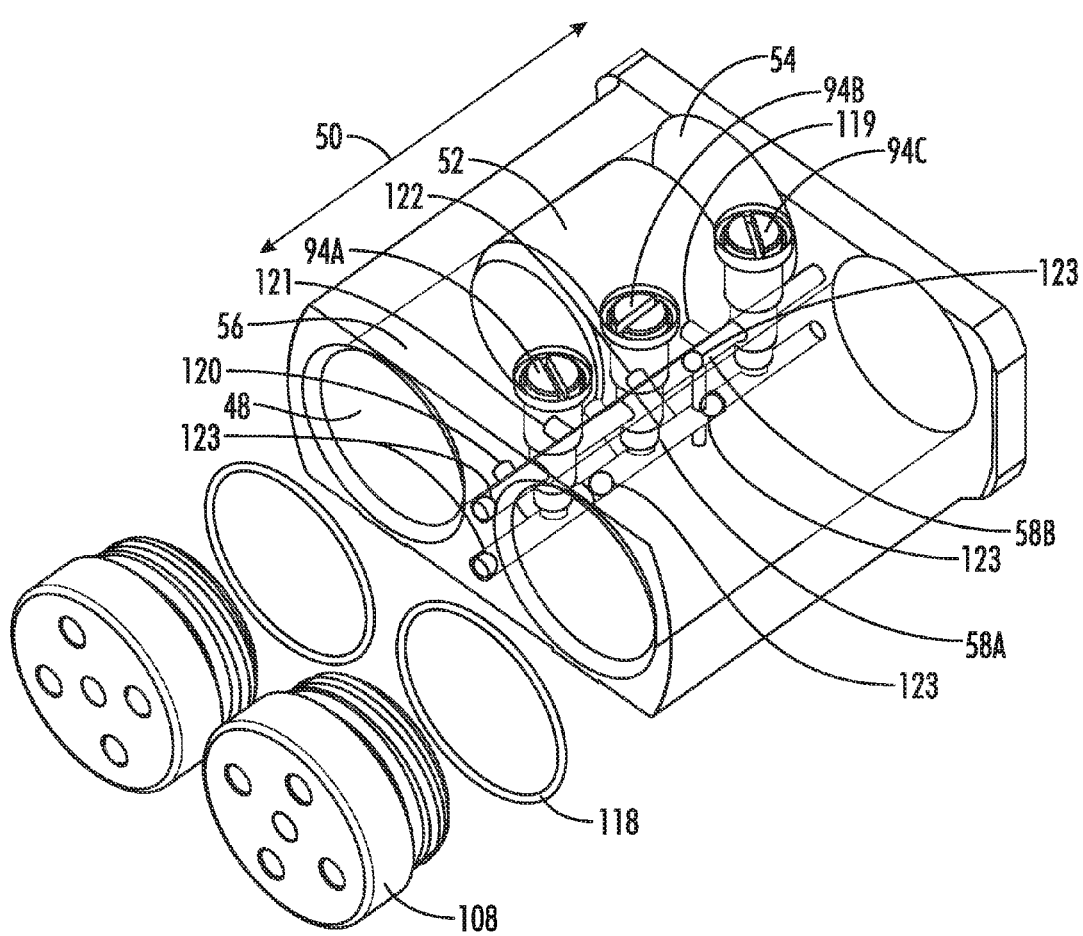
FIG. 10 illustrates a proximal, exploded perspective view of a portion of the hydraulic door closer of FIG. 1.
Figure 11:
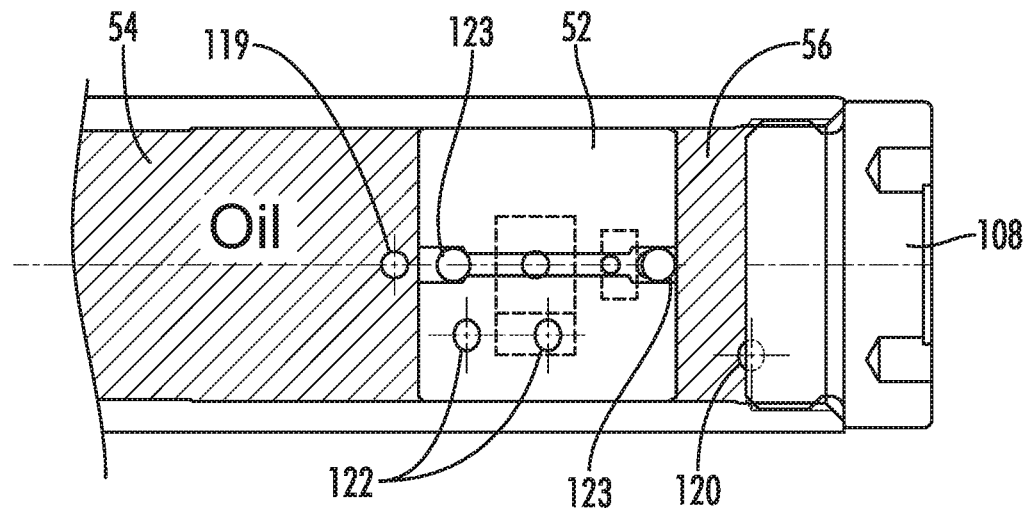
FIG. 11 illustrates a cross-sectional view of the hydraulic door closer of FIG. 1.
Figure 12:
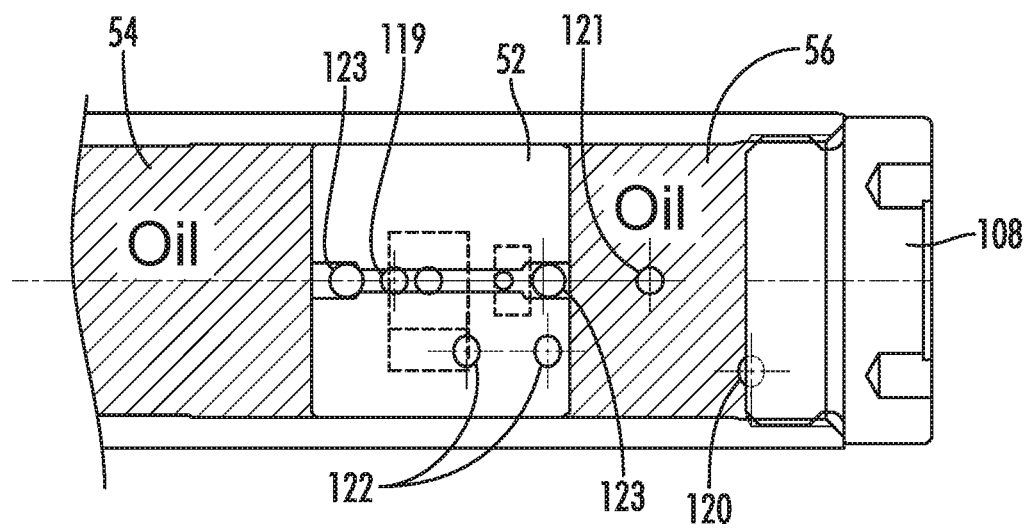
FIG. 12 illustrates a cross-sectional view of the hydraulic door closer of FIG. 1.
Figure 13:
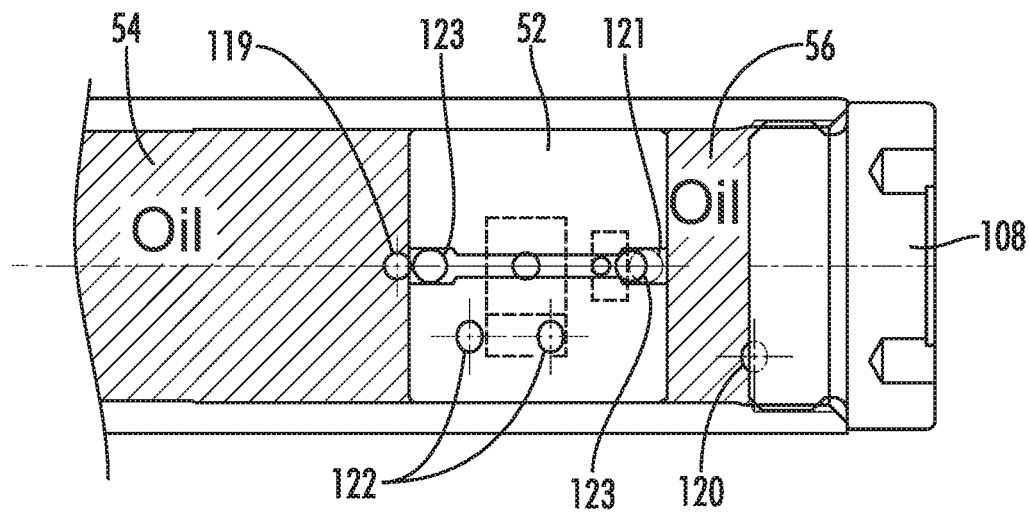
FIG. 13 illustrates a cross-sectional view of the hydraulic door closer of FIG. 1.
Figure 14:
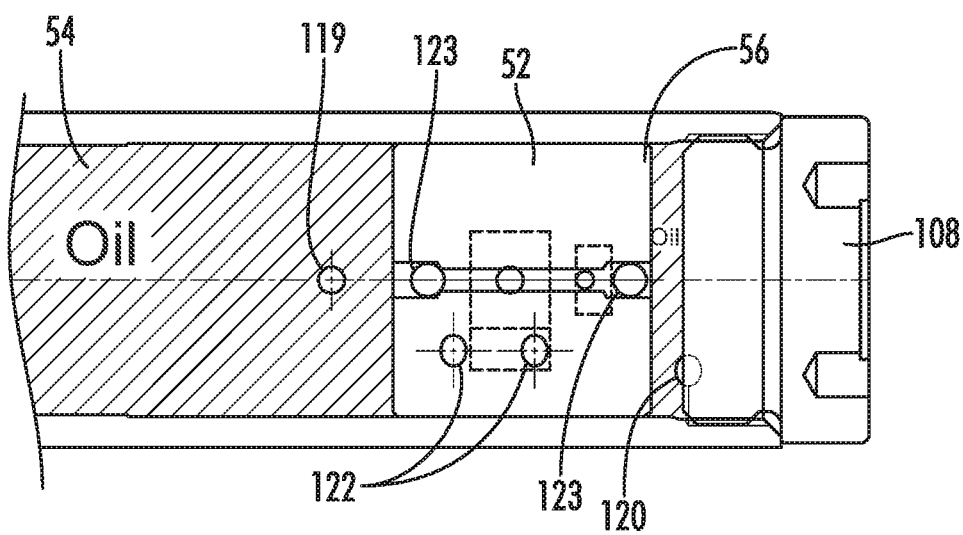
FIG. 14 illustrates a cross-sectional view of the hydraulic door closer of FIG. 1.
Figure 15:
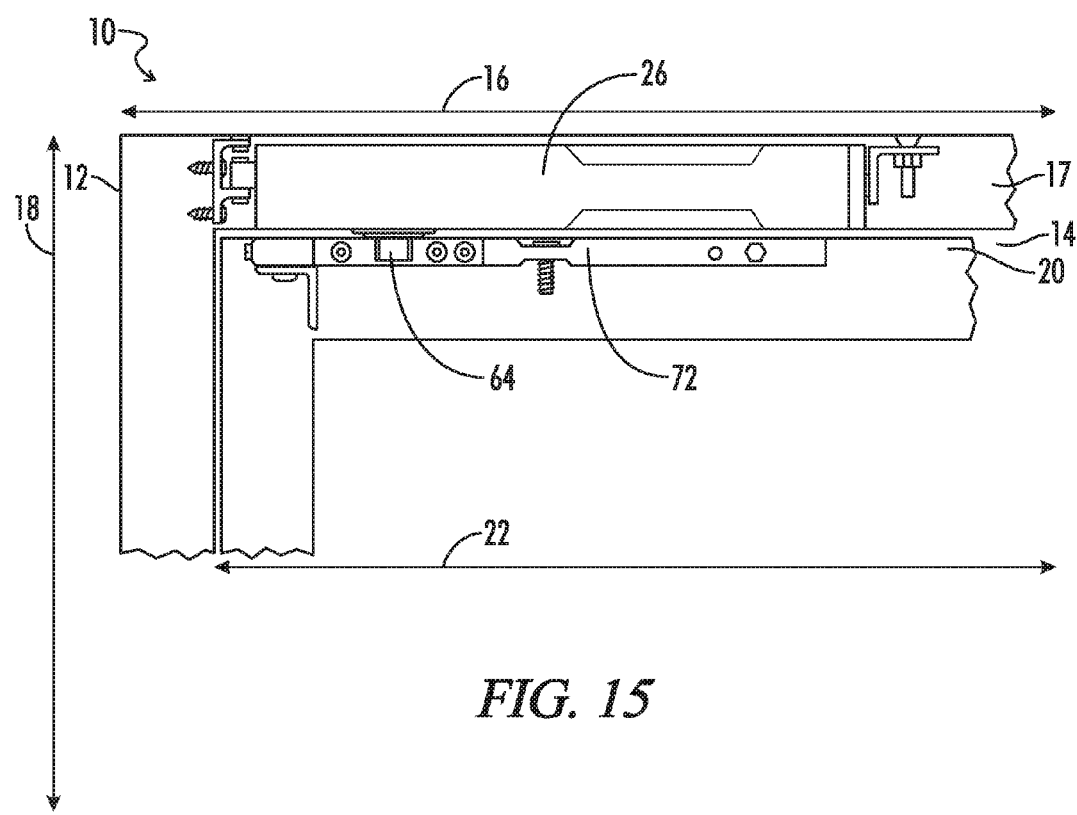
FIG. 15 illustrates a side elevation view of the hydraulic door closer of FIG. 1 in use in a door.
Figure 16:
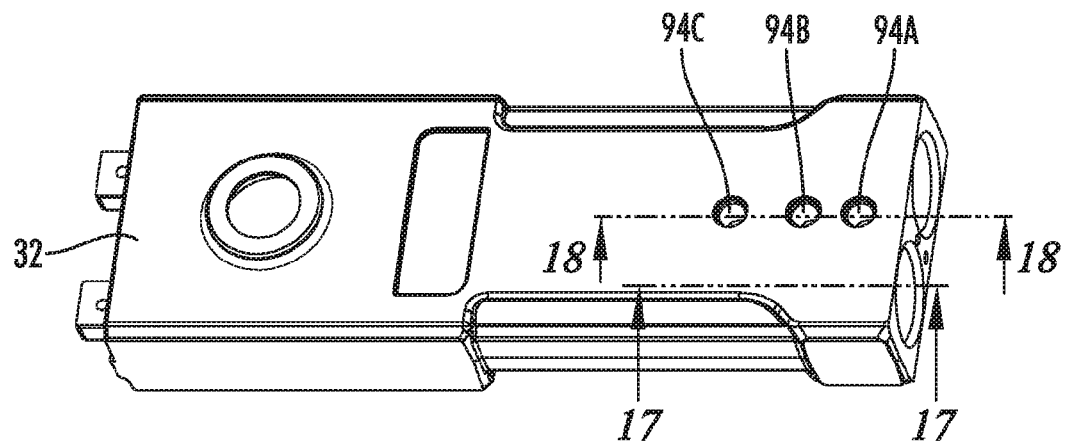
FIG. 16 illustrates a bottom perspective view of the hydraulic door closer of FIG. 1; the spindle is not shown for ease of viewing.
Figure 17:
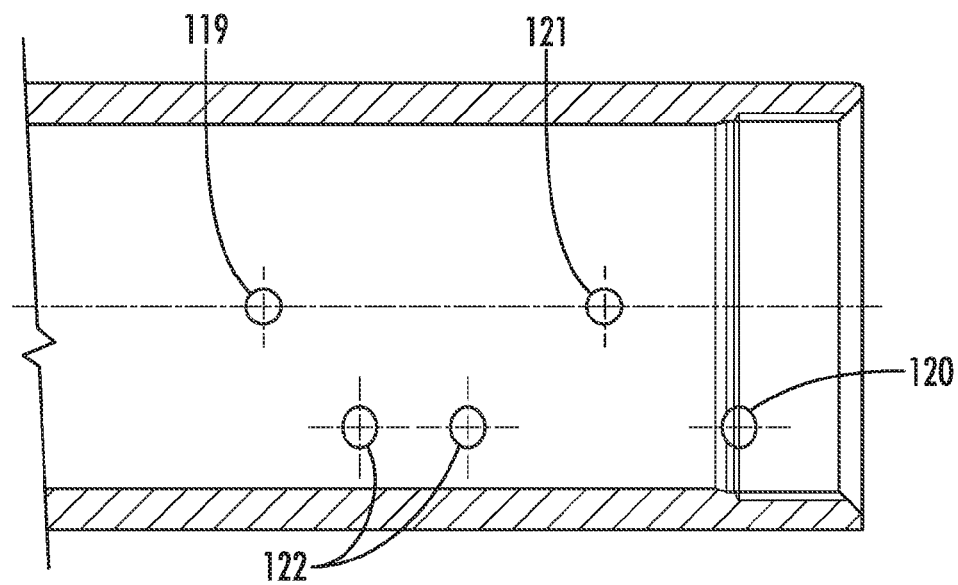
FIG. 17 illustrates a sectional view of the hydraulic door closer of FIG. 16, taken along line 17-17 of FIG. 16.
Figure 18:
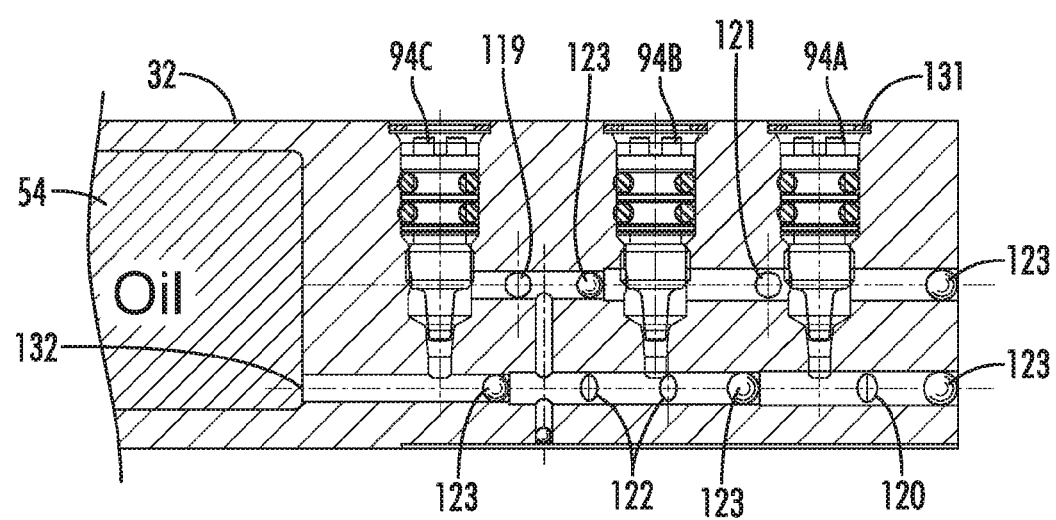
FIG. 18 illustrates a sectional view of the hydraulic door closer of FIG. 16, taken along line 18-18 of FIG. 16.

The spring 112 may be bolted to the cam assembly 62 using the bolts 130 shown in FIG. 9.

The at least one channel may include several channels 58A and 58B that are regulated by several valves (e.g., a backcheck valve 94C which is nearest to the spindle 64, a sweep valve 94B, and a latch valve 94A that is furthest from the spindle 64), as well as drains 119, 120, 121, and 122 and balls 123.

Operation of the Door Closer

One example of operation of the door closer 10 will now be described. It will be understood that the operation provided is exemplary.

The Operation of the Sweep and Latch Valve

Opening the backcheck valve 94C reduces backcheck and makes the door easier to open. Closing the sweep valve 94B and latch valve 94A makes the sweep and latch closing of the door slower.

While opening backcheck valve 94C, close sweep valve 94B and latch valve 94A

The door is moved from the closed position to the open position.

The spindle 64 rotates, moving the piston 52 distally towards the spindle 64 and the housing distal end 42, compressing the spring 112. The piston 52 moves through the backcheck drain hole 119. Fluid in the distal chamber 54 moves to the proximal chamber 56 by moving through the main hole 132, upwardly through the backcheck drain hole 119 where the fluid is blocked by steel ball 123, and then travels through the drain hole 122.

The spring 112 relaxes, and the piston 52 moves proximally towards the end cap 108, causing the spindle 64 to return to the start position.

With the movement above, opening the sweep valve 94B makes the fluid in the proximal chamber 56 move to the distal chamber 54 using sweep drain hole 121, sweep valve 94B, drain hole 122 and piston 52.

When fluid in the distal chamber 54 is moving, if the piston 52 is blocking sweep drain hole 121, sweeping is done. See FIG. 11.

When sweeping is done, opening the latch valve 94A will allow leftover fluid in the proximal chamber 56 to move back to the distal chamber 54 using latch drain hole 120, upwardly through latch valve 94A, downwardly through sweep valve 94B, out drain hole 122 and piston 52, as a result the door is fully closed. See FIG. 12.

The Operation of the Backcheck Valve

Fully close backcheck valve 94C, the door is opened, rotating the spindle 64 and moving the piston 52 distally (toward the spindle 64), as fluid moves from the distal chamber 54 to the proximal chamber 56 via the backcheck drain hole 119. While the piston 52 is blocking the backcheck drain hole 119, the piston 52 cannot move since fluid is controlled by backcheck drain hole 119 only. See FIG. 12.

When the piston 52 is not moving, the spindle 64 cannot rotate further due to the intense pressure in the housing interior 28. This is what is referred to as backcheck.

(When the backcheck valve 94C is fully closed, a very small amount of oil flows in the gap between the cylinder 48 and piston 52, allowing the door to open slowly further).

The items referred to above are labelled in the drawings per the below legend.

| | |
|---|---|
| system | 10 |
| door frame | 12 |
| door opening | 14 |
| door frame width | 16 |
| door frame height | 18 |
| door top | 20 |
| door width | 22 |
| closer | 24 |
| housing | 26 |
| interior | 28 |
| housing top | 30 |
| housing bottom | 32 |
| housing height | 34 |
| front side | 36 |
| rear side | 38 |
| housing thickness | 40 |
| distal end | 42 |
| proximal end | 44 |
| housing width | 46 |
| cylinder | 48 |
| cylinder length | 50 |
| piston | 52 |
| distal chamber | 54 |
| proximal chamber | 56 |
| channel | 58A & B |
| channel length | 60 |
| cam assembly | 62 |
| spindle | 64 |
| spindle height | 66 |
| spindle perimeter | 68 |
| spindle rotational axis | 70 |
| arm | 72 |
| top cap | 78 |
| top cap diameter | 80 |
| spindle seal | 82 |
| Spindle seal inner wall | 83 |
| spindle seal diameter | 84 |
| Spindle seal outer wall | 85 |
| bottom bearing | 86 |
| Spindle seal groove | 87 |

-continued

| | |
|---|---|
| bottom bearing diameter | 88 |
| Spindle seal top | 89 |
| top cap circumference | 90 |
| Spindle seal bottom | 91 |
| top cap o-ring | 92 |
| at least one valve | 94A, B, C |
| valve stem | 96 |
| top ridge | 98 |
| middle ridge | 100 |
| lower ridge | 102 |
| top o-ring | 104 |
| lower o-ring | 106 |
| end cap | 108 |
| end cap diameter | 110 |
| spring | 112 |
| spring distal end | 114 |
| spring proximal end | 116 |
| end cap o-ring | 118 |
| back check drain hole | 119 |
| latch drain hole | 120 |
| sweep drain hole | 121 |
| drain hole | 122 |
| steel ball | 123 |
| Port of housing | 126 |
| Top Bearing | 128 |
| Bolts | 130 |
| Locking ring | 131 |
| Main drain hole | 132 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies. In addition, the steps of the methods described herein can be performed in any suitable order, including simultaneously.

What is claimed is:

1. A hydraulic overhead concealed door closer system comprising:
   a) a door frame defining a door opening, the door frame comprising a door frame width and a door frame top located above the door opening;
   b) a door comprising a door top and a door width, the door configured to pivot from a closed position in which the door covers the door opening, the door width is substantially parallel to the door frame width and the door top faces the door frame top, to an open position in which the door does not cover the door opening and in which the door width is not substantially parallel to the door frame width; and
   c) a hydraulic overhead concealed door closer located in the door frame top and comprising:
      i) a housing comprising an interior, a top side, a bottom side opposite the top side and facing the door top when the door is in the closed position, a housing height extending from the housing top side to the housing bottom side and generally perpendicular to the door frame width and the door width, a front side, a rear side, a housing thickness extending from the housing front side to the housing rear side and generally perpendicular to the housing height and generally perpendicular to the door width when the door is in the closed position, a proximal end, a distal end, a housing width extending from the housing proximal end to the housing distal end and generally perpendicular to the housing height and the housing thickness and generally parallel to the door width when the door is in the closed position;
      ii) a cylinder located in the housing interior, the cylinder having a cylinder length generally parallel to the housing width;
      iii) a moveable piston located in the cylinder and configured to move at least partially along the cylinder length, the moveable piston dividing the housing interior into a proximal chamber and a distal chamber;
      iv) hydraulic fluid located in the proximal chamber and the distal chamber;
      v) at least one channel located in the housing interior and configured to transport hydraulic fluid between the proximal and distal chambers, the at least one channel having a channel length generally parallel to the housing width and the cylinder length;
      vi) a cam assembly comprising a spindle connected to the door top, the spindle having a spindle height generally parallel to the housing height and a spindle perimeter generally perpendicular to the spindle height, the spindle extending below the housing bottom side, the spindle configured to rotate about a spindle rotational axis generally parallel to the spindle height; and
      vii) a top cap having a top cap diameter generally perpendicular to the housing height and sealing the distal chamber from the door frame, the top cap located at the top side of the housing and opposite to the spindle,
   wherein pivoting the door from the closed position to the open position is configured to cause the spindle to rotate about the spindle rotational axis and cause the piston to move within the cylinder at least partially along the cylinder length.

2. The hydraulic overhead concealed door closer system of claim 1, wherein the system further comprises a spindle seal, the spindle seal surrounding and compressing against the perimeter of the spindle and located below the top cap.

3. The hydraulic overhead concealed door closer system of claim 2 wherein the spindle seal comprises a diameter generally perpendicular to the housing height.

4. The hydraulic overhead concealed door closer of claim 3 wherein the spindle seal comprises an inner wall surrounding and compressing against the perimeter of the spindle, an outer wall, a channel between the inner wall and outer wall, an open top end and a closed bottom end.

5. The hydraulic overhead concealed door closer of claim 4, wherein the spindle seal is comprised of rubber.

6. The hydraulic overhead concealed door closer system of claim 2 wherein the system further comprises a bottom bearing located between the spindle seal and the cam assembly, the bottom bearing comprising a diameter generally perpendicular to the housing height.

7. The hydraulic overhead concealed door closer system of claim 1 wherein the top cap further comprises a top cap circumference and further wherein the system further comprises an O-ring surrounding the top cap circumference.

8. The hydraulic overhead concealed door closer system of claim 1 wherein the top cap is attached to the housing via epoxy and threading.

9. The hydraulic overhead concealed door closer system of claim 1 wherein the top cap and the housing are comprised of the same material.

10. The hydraulic overhead concealed door closer system of claim 1 wherein the system further comprises at least one valve controlling the flow of the hydraulic fluid within the at least one channel, the at least one valve comprising a valve stem having a valve stem height generally parallel to the housing height and further wherein the valve stem comprises a top ridge, a middle ridge located below the top ridge, and a lower ridge located below the top ridge and the middle ridge, a top O-ring located between the top ridge and the middle ridge and compressing against the valve stem and a lower O-ring located between the middle ridge and the lower ridge and compressing against the valve stem.

11. The hydraulic overhead concealed door closer system of claim 1 wherein the system further comprises at least one end cap located on the proximal end of the housing, the end cap comprising an end cap diameter generally perpendicular to the housing width, at least one spring located distally relative to the end cap and the piston, the spring comprising a proximal end attached to the piston and a distal end, the spring having a relaxed position and a compressed position, and further wherein moving the door from the closed position to the open position is configured to cause the door to cause the spindle to rotate about the spindle rotation axis and cause the spring to move from the relaxed position to the compressed position and the piston to move distally within the cylinder.

12. The hydraulic overhead concealed door closer system of claim 11 wherein the end cap is configured to seal the hydraulic fluid within the proximal chamber and further wherein the housing and the end cap are comprised of the same material.

13. The hydraulic overhead concealed door closer system of claim 11 wherein the end cap further comprises a circumference and further wherein the system further comprises an O-ring, the O-ring surrounding and compressing against the end cap circumference.

14. The hydraulic overhead concealed door closer system of claim 1, wherein pivoting the door from the closed position to the open position is configured to cause the piston to move distally and move hydraulic fluid located distal to the piston distally within the cylinder.

15. The hydraulic overhead concealed door closer system of claim 14, wherein moving the piston distally within the cylinder is configured to cause hydraulic fluid to move from the distal chamber through the at least one channel and into the proximal chamber.

16. The hydraulic overhead concealed door closer system of claim 1, wherein pivoting the door from the open position to the closed position is configured to cause the piston to move proximally and move hydraulic fluid located proximal to the piston proximally within the cylinder.

17. The hydraulic overhead concealed door closer system of claim 16, wherein moving the piston proximally within the cylinder is configured to cause hydraulic fluid to move from the proximal chamber through the at least one channel and into the distal chamber.

\* \* \* \* \*